United States Patent Office 3,816,603
Patented June 11, 1974

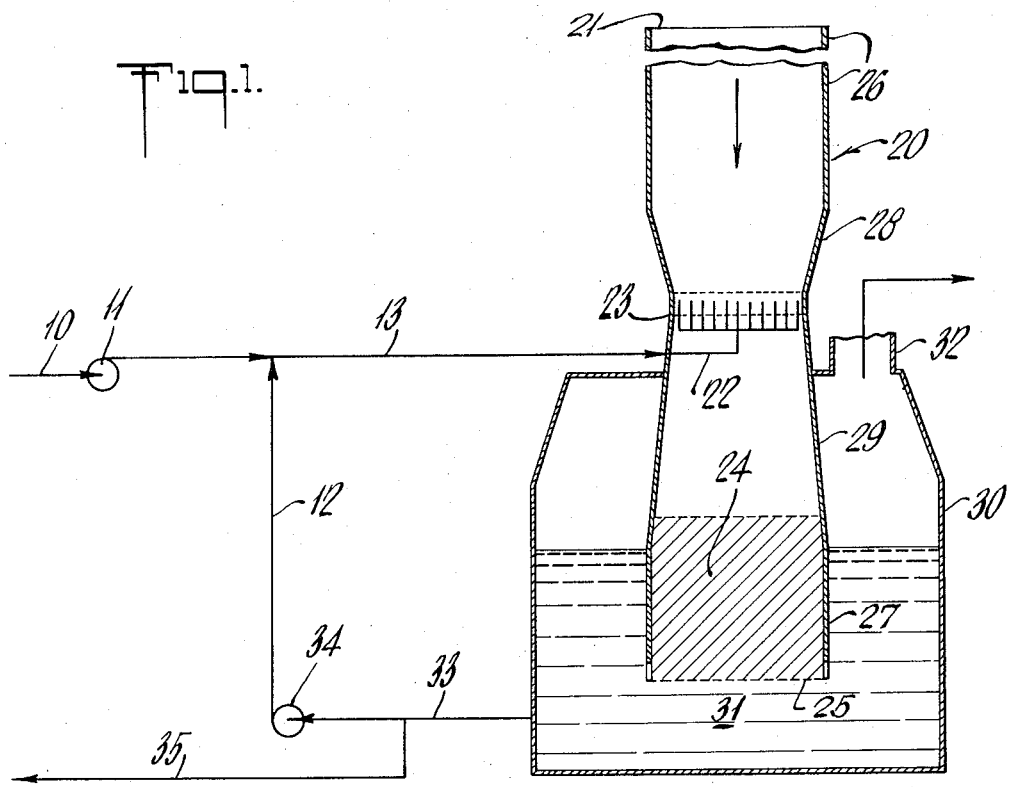
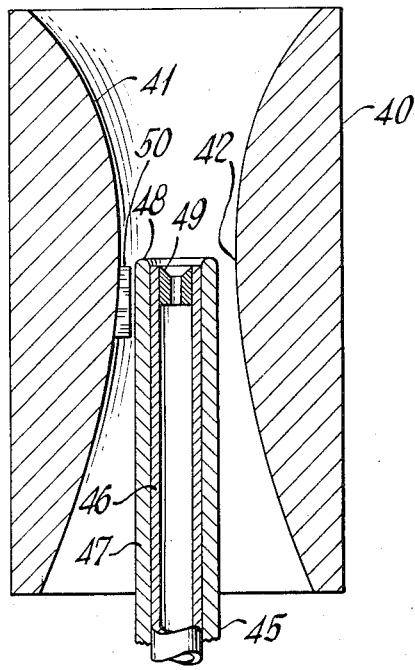
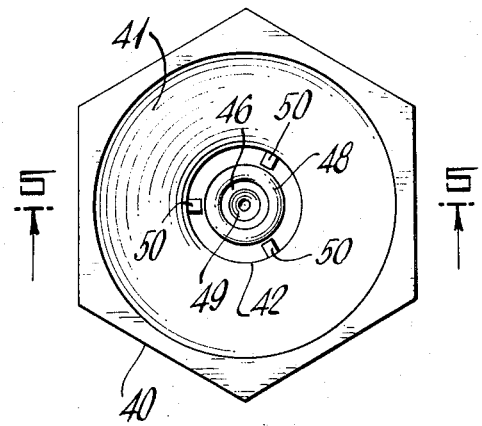

3,816,603
PROCESS FOR DECOMPOSING AMMONIUM SULFATE INTO AMMONIUM BISULFATE AND AMMONIA
Albert B. Welty, Jr., Westfield, N.J., assignor to Esso Research and Engineering Company
Filed Aug. 21, 1972, Ser. No. 282,352
Int. Cl. C01c 1/02, 1/04
U.S. Cl. 423—520         8 Claims

ABSTRACT OF THE DISCLOSURE

Process and apparatus for decomposing ammonium sulfate. An aqueous solution of ammonium sulfate at elevated temperature and pressure, e.g., about 475° F. and 450 p.s.i.g. is injected into a flowing stream of hot combustion gases which is initially at a temperature above the decomposition temperature of ammonium sulfate and at a pressure substantially lower than that of the ammonium sulfate solution. The water content of the solution is flash evaporated adiabatically and the ammonium sulfate, in the form of finely divided particles suspended in the combustion gas stream, is decomposed into ammonium bisulfate and ammonia. The apparatus includes an essentially tubular reactor having a plurality of venturi mixers therein, and a plurality of solution supply pipes for spraying ammonium sulfate solution into the throats of the venturi mixers.

BACKGROUND OF THE INVENTION

This invention relates to processes for the thermal decomposition of ammonium sulfate.

The thermal decomposition of ammonium sulfate into ammonium bisulfate and ammonia is well known. The reaction proceeds according to the equation:

$$(NH_4)_2SO_4 \rightarrow NH_4HSO_4 + NH_3$$

The product ammonium bisulfate, usually with a small amount (e.g., about 15% by weight or less) of unconverted ammonium sulfate, is recovered in the form of a molten salt. This reaction is carried out at a temperature above the decomposition temperature of ammonium sulfate into ammonium bisulfate and ammonia (approximately 650° F.) but below the temperature at which secondary decomposition reactions of ammonium sulfate and/or ammonium bisulfate (e.g., formation of sulfur dioxide, nitrogen, additional ammonia, and water vapor) take place in substantial amounts (approximately 900° F.; literature authorities are not precisely agreed as to the temperature at which such secondary decomposition reactions begin to take place. When this temperature is exceeded, the extent of secondary decomposition depends upon the temperature and the time of exposure).

Ammonium sulfate is a by-product of various processes, including the desulfurization of flue gas, the production of fertilizers, and the production of certain organic chemicals including caprolactam.

Various means of supplying the heat required for decomposition of ammonium sulfate are known. Much of the art discloses low temperature heat sources such as electricity or steam, preferably using a heat exchanger, in order to avoid excessive local temperatures and attendant unwanted secondary decomposition. Direct heating with steam, which is described in U.S. Pat. No. 2,405,747, causes the ammonia evolved to be diluted with water, which is generally undesirable. Indirect heat exchange with a hot combustion gas is described in U.S. Pat. No. 3,243,261. Various heat sources are disclosed in British Pat. No. 1,247,365. Direct contact between an aqueous ammonium sulfate solution or slurry and hot combustion gas is disclosed in U.S. Pat. No. 3,645,671 to Lindsay I. Griffin, Jr. and myself, dated Feb. 29, 1972, and in my U.S. Pats. Nos. 3,674,427, issued July 4, 1972, and 3,676,059, issued July 11, 1972.

A small controlled amount of secondary decomposition may be desirable under certain circumstances, and this can be achieved, for example, as disclosed in my Pat. 3,676,059 supra. U.S. Pat. 3,282,646 describes a two-stage process in which ammonium sulfate is decomposed into ammonium bisulfate and ammonia in a first stage using indirect heat exchange, and the product ammonium bisulfate is then decomposed in a second stage to yield additional ammonia, sulfur dioxide, nitrogen, and water vapor. Although a small controlled amount of secondary decomposition may be desirable in certain circumstances, particularly in flue gas desulfurization processes as disclosed in Pat. 3,676,059, uncontrolled decomposition is undesirable because it wastes ammonia which is converted into nitrogen and water vapor and because it produces sulfur dioxide rather than the desired ammonium bisulfate.

Direct contact with hot combustion gas is the most efficient of all heat transfer methods for decomposing ammonium sulfate from the standpoint of heat economy because all of the available heat in the combustion gas down to the decomposition temperature of the ammonium sulfate is utilized. It has the further advantage of avoiding costly heat exchange equipment which is subject to severe corrosion. However, the high temperature heat source maximizes the risk of local overheating, and it is necessary to control the local time and temperature of exposure of the ammonium sulfate in order to avoid unwanted secondary decomposition.

Prior processes for decomposing ammonium sulfate by injection of an ammonium sulfate solution or slurry into a hot gas stream, have utilized the heat of the gas stream both to evaporate the water content of the ammonium sulfate solution or slurry and to heat and to decompose the ammonium sulfate. Because some unevenness of droplet size and distribution is inevitable, a portion of the ammonium sulfate is overheated with attendant unwanted secondary decomposition.

SUMMARY OF THE INVENTION

According to this invention, ammonium sulfate is decomposed by injecting an aqueous solution comprising ammonium sulfate at elevated temperature and pressure into a flowing stream of a hot combustion gas which is initially at a temperature above about 900° F. and at a pressure which is substantially lower than the pressure of the solution. The temperature of the solution is above the boiling point thereof at the pressure of the gas at the point of injection. The water content of the solution is flash evaporated at the instant of injection, utilizing the heat already contained in the solution, and the ammonium sulfate is decomposed into ammonium bisulfate and ammonia, utilizing heat contained in the hot gas. The proportion of hot solution to hot gas is such that the final temperature of the mixture is in the range of about 600° F. to about 900° F. Ammonium bisulfate and unconverted ammonium sulfate are separated from the gas mixture and recovered. This process is preferably carried out in a reactor having a mixing zone containing a plurality of contiguous venturi mixers in parallel, each of which contains a nozzle for injecting the solution into the gas stream.

DRAWINGS

In the drawings:
FIG. 1 is a vertical sectional view of the reactor of this invention with portions shown diagrammatically.
FIG. 2 is a top plan view of the mixer portion of the reactor.

FIG. 4 is a top plan view of an individual venturi mixing element and nozzle therefor.

FIG. 5 is a vertical sectional view, taken along line 5—5 of FIG. 4, showing an individual venturi mixing element and solution nozzle in detail.

DESCRIPTION OF THE PREFERRED EMBODIMENT

Figure 2:
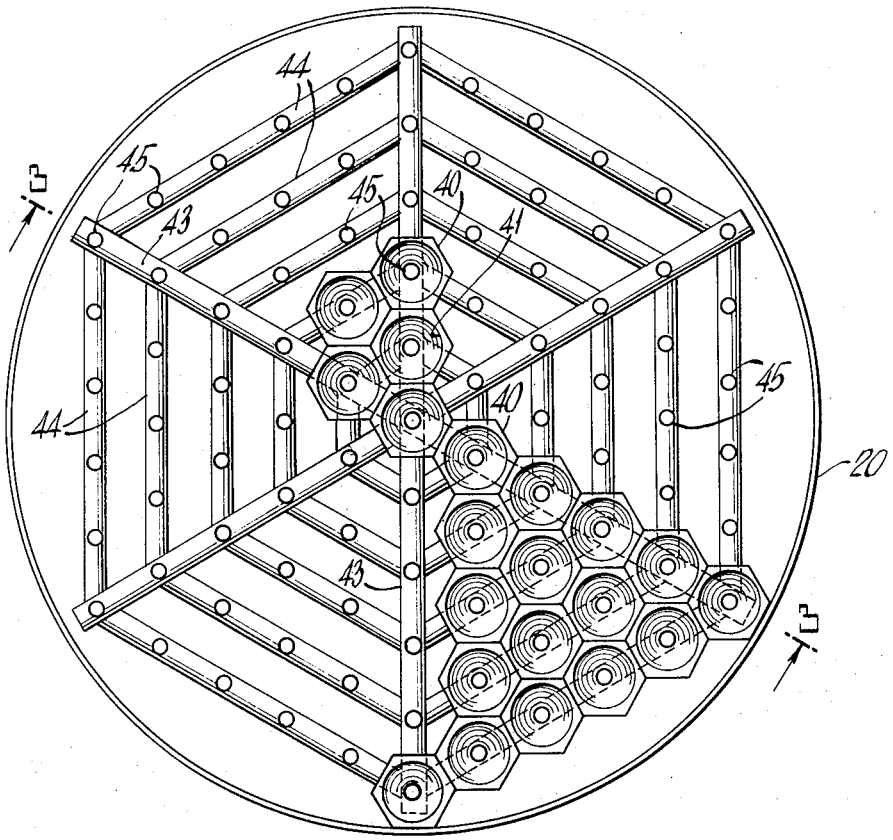

Referring now to FIG. 1, a fresh aqueous ammonium sulfate solution or slurry flowing in line 10 is pumped in pump 11 up to a desired injection pressure, which is generally in the range of about 300 to about 600 p.s.i.a. This ammonium sulfate solution or slurry can be obtained from any source in which aqueous ammonium sulfate is produced, as for example an acidifier in a flue gas desulfurization system such as those shown in U.S. Pat. Nos. 2,405,747 and 3,645,671, both previously mentioned. This solution or slurry may contain ammonium bisulfate as well as some impurities in addition to ammonium sulfate. The ammonium sulfate solution or slurry from pump 11 is mixed with recycled, hot ammonium bisulfate product in line 12 in order to heat the ammonium sulfate solution to the desired temperature (about 350° to about 550° F.) for injection into a hot gas stream. The resulting hot ammonium sulfate-containing solution flows through solution feed line 13 into a flowing hot gas stream in reactor 20. This hot solution contains about 10% to about 50% by weight of water. The reactor 20 is preferably a vertical, essentially tubular reactor.

The hot gas, which is preferably a hot combustion gas formed in a burner (not shown), enters the inlet 21 of reactor 20 at a temperature which is typically about 2500°–3000° F., and flows downwardly through the reactor. The hot ammonium salt solution (which contains both ammonium sulfate and ammonium bisulfate) flows from feed line 13 into a conduit 22 inside reactor 20. This hot solution is injected into the flowing hot gas stream in mixing zone 23. The gas velocity in mixing zone 23 is such that a high degree of turbulence prevails. The water content of the solution is flash evaporated, and the ammonium salts which are present appear as very fine dispersed particles because of the explosive release of energy as the steam forms. The resultant steam, ammonium sulfate and ammonium bisulfate, are rapidly mixed with the hot gas stream, and the major proportion of ammonium sulfate is decomposed into ammonium bisulfate and ammonia. The final temperature of the gas mixture, which contains combustion gas, water vapor, ammonia, and suspended ammonium bisulfate particles, is about 600° to about 900° F., and the hot gas and ammonium salt solution are proportioned to give a final temperature in this range. The gas mixture is passed through a bed 24 of inert packing material, where the droplets of ammonium bisulfate product (which may contain a small amount, up to about 15% by weight, of unconverted ammonium sulfate) are coalesced. Both the product gas (a mixture of combustion gas, water vapor and ammonia) and the ammonium bisulfate product are discharged through the reactor outlet 25 at the bottom of the reactor.

The preferred reactor 20 shown in FIG. 1 is an essentially tubular reactor having cylindrical portions 26 and 27 near the inlet and outlet ends, respectively, and a converging section 28 and diverging section 29 which are upstream and downstream, respectively, of the mixing zone 23. The converging and diverging sections are not essential but are beneficial in providing essentially uniform gas flow over the entire cross sectional area in mixing zone 23.

Ammonium bisulfate product is collected in receptacle 30 which surrounds the lower portion of reactor 20, including outlet 25. The level of the pool 31 of ammonium bisulfate product collected in receptacle 30 is ordinarily above the outlet 25. The product gas, i.e. combustion gas, ammonia, and water vapor, after passing through the inert packing 24 and the reactor outlet 25, is bubbled through the pool 31 and leaves the receptacle 30 through an overhead exit 32.

Product ammonium bisulfate is withdrawn from the receptacle 30 through line 33 at a temperature above the melting point thereof and below about 900° F., ordinarily approximately 750° F., and at a pressure ordinarily approximately 25 p.s.i.g. This pressure is determined by the pressure at which it is desired to use the ammonia-containing gas issuing through exit 32. Lower pressures are preferred because they require less compression of the air required to generate the combustion gas, and also because flash evaporation of the water from the ammonium sulfate solution occurs more rapidly at lower pressures. However, the pressure is not critical and can range from about atmospheric up to about 150 p.s.i.g. or higher.

A portion of the ammonium bisulfate product in line 33 is pumped by pump 34 into recycle line 12, and is mixed with fresh ammonium sulfate solution or slurry as previously described. A minor portion of the molten ammonium bisulfate in line 33 is withdrawn as product through line 35. In flue gas desulfurization systems, this product ammonium bisulfate in line 35 may be returned to the acidifier.

While hot combustion gas having a temperature of about 2500–3000° F. as it enters the mixing zone 23 (assuming that little heat loss occurs between the burner and the mixing zone) is the preferred hot gas source, other hot gas sources having a temperature of at least 900° F. at the inlet of mixing zone 23 can be used instead. The pressure of the hot gas as it enters the reactor 20 is determined largely by the pressure at which it is desired to produce the gas issuing from the gas exit 32. To this must be added the pressure drop through the apparatus. Ordinarily, the entering gas is somewhat above atmospheric pressure. Gas pressures of about 25 to about 200 p.s.i.a. at the inlet 21, corresponding to about 15 to about 180 p.s.i.a. in the mixing zone, may be used.

The temperature and pressure of the solution in line 13 are high enough so that the solution is flash evaporated as it leaves the nozzles and enters the gas stream in mixing zone 23. This means that the solution pressure in line 13 is greater than the gas pressure in mixing zone 23, and the temperature of the solution is above the boiling point of the solution at the gas pressure prevailing at the points of injection in mixing zone 23. The heat content of the solution is preferably great enough to supply all of the heat required for vaporization of the water. In that case, the hot gas supplies only the heat required to heat the steam and ammonium sulfate to reaction temperature (about 650°–900° F.) and to decompose the ammonium sulfate. The relative flow rates of solution and hot gas are proportioned accordingly.

The solution pressure in line 13 is not less than about 20 p.s.i.a., preferably from about 50 to about 200 p.s.i.a. The temperature in line 13 is not less than about 300° F. (nor more than about 600° F.), preferably from about 350° to about 550° F. The pressure is preferably high enough to maintain 100 percent liquid phase up to the injection nozzles. What this is depends on the amount of ammonium sulfate and bisulfate in solution. Ordinarily the pressure need not exceed about 750 p.s.i.a., and more usually will be in the range of about 300 to about 600 p.s.i.a. The weight ratio of recycled ammonium bisulfate in line 12 to fresh aqueous ammonium sulfate in line 10 may be in the range of about 1.0 to about 3.0; ordinarily this recycle ratio is at least about 1.2 in order to supply the necessary heat of vaporization for the solution as it enters the reaction zone. The ammonium sulfate-ammonium bisulfate solution in line 13 is preferably in a single liquid phase in order to facilitate smooth and trouble-free operation in the solution distribution and nozzle system. However, the operativeness of the present process does not require the existence of a homogeneous single liquid phase in line 13.

While the fresh ammonium sulfate-containing solution in line 10 can be heated to the desired temperature (300°–600° F., preferably 350°–550° F.) by indirect heating, the preferred means of heating is by admixture with hot recycled ammonium bisulfate. The solution in line 13 may either contain ammonium bisulfate or not when there is no admixture of fresh and recycled ammonium salt streams.

A reaction temperature of about 750° to about 900° F. in mixing zone 23 and downstream thereof is ordinarily preferred. This assures decomposition of ammonium sulfate into ammonium bisulfate and ammonia while avoiding secondary decomposition. Actually, a controlled degree of secondary decomposition may be desirable in flue gas desulfurization installations, in order to consume a quantity of ammonium bisulfate equivalent to the quantity of ammonium bisulfate formed from $SO_3$ in the flue gas and by oxidation of $SO_2$ in the flue gas scrubber. In that case, the reaction temperature may be as high as 1000° F.

The pressure of the flowing gas is substantially lower than that of the solution prior to injection. The cross-sectional area of the reactor 20 is ordinarily smaller at the mixing zone 23 than either upstream or downstream thereof, although this is not required for operativeness of the present process. This can be achieved by suitable structural arrangements, as for example by providing a venturi or preferably a multiplicity of venturi mixers as will be shown and described in greater detail with reference to FIGS. 2–5. The water in the solution is flash evaporated and adiabatic cooling occurs as the solution emerges from the nozzles into the mixing zone 23. The instantaneous conversion of water to steam leaves the ammonium sulfate as very finely divided particles which can be very quickly and homogeneously heated to reaction temperature by the hot combustion gas. The high combustion gas velocity in the individual venturis in mixing zone 23 promote turbulent flows so that very rapid homogeneous mixing of the combustion gas with the ammonium sulfate particles and steam occurs. This rapidly and uniformly cools the hot combustion gas stream to the desired reaction temperature in the range of about 750° to below about 900° F., so that the ammonium sulfate is decomposed into ammonium bisulfate and ammonia while the secondary decomposition of ammonium bisulfate is substantially avoided. Also, the rapid mixing of the injected solution with the hot combustion gas minimizes local overheating of ammonium sulfate and ammonium bisulfate which is either obtained as a decomposition product or is injected along with the ammonium sulfate. Because the heat to evaporate the water has already been provided by the solution itself, and because the particles are so finely divided, equilibrium temperature is reached in a small fraction of a second, in the order of one one-hundredth of a second or less, so that there is little opportunity for reaction at temperatures over about 900° F. Thorough mixing and avoidance of local overheating is better achieved by the flash evaporation method of this invention than would be achieved by injecting an aqueous solution of ammonium sulfate at a temperature low enough that transfer of heat from the hot gas stream to the solution would be required in order to vaporize the water.

The apparatus of this invention will now be described with particular reference to FIGS. 1–5.

Referring now to FIG. 1, the reactor 20 has an inlet 21 for hot gas, a supply conduit 22 (shown also in FIG. 3) for aqueous solution containing ammonium sulfate, means for injecting said aqueous solution into the hot gas stream in mixing zone 23 (to be described with reference to FIGS. 2–5), inert packing 24 to coalesce the ammonium bisulfate mist, and an outlet 25 for discharging product gas and molten ammonium bisulfate product. The supply conduit 22 is connected to hot solution feed line 13. The preferred reactor shown is an essentially tubular reactor of varying cross-sectional area having a converging section 28, a mixing zone 23, a diverging section 29, and an open lower end which constitutes the reactor outlet 25. The mixing zone 23 has a smaller cross-sectional area than any other portion of the reactor. The lower end of the reactor 20 is surrounded by a receptacle 30 for product ammonium bisulfate; this receptacle has an outlet 33 for molten ammonium bisulfate product and a product gas outlet 32.

The structure of mixing zone 23 will now be described in detail with reference to FIGS. 2 to 5.

Referring now to FIG. 2, the mixing zone 23 includes a plurality of contiguous and preferably ceramic venturi mixers 40 arranged in a hexagonal pattern and providing a plurality of parallel gas flow paths. Each of these venturi mixers is of hexagonal cross section and includes a central passageway 41 having a throat 42 for gas flow. The venturi mixers are fitted tightly against one another in order to force the gas to flow through the central passageways.

Aqueous solution is supplied to the mixing zone 23 through a network of pipes connected to the primary solution supply conduit 22. The network of pipes consists of six distributor pipes 43 extending radially outwardly from the solution supply conduit 22 at equiangular spacing (i.e., 60°), a series of cross connector pipes 44 linking the radial pipes 43, and a series of vertical branch pipes 45, which are connected at their lower ends either to a distributor pipe 43 or to a cross connector pipe 44. The number of branch pipes and the number of venturi mixers 40 are equal; each branch pipe terminates in the throat 42 of a venturi mixer.

Figure 3:
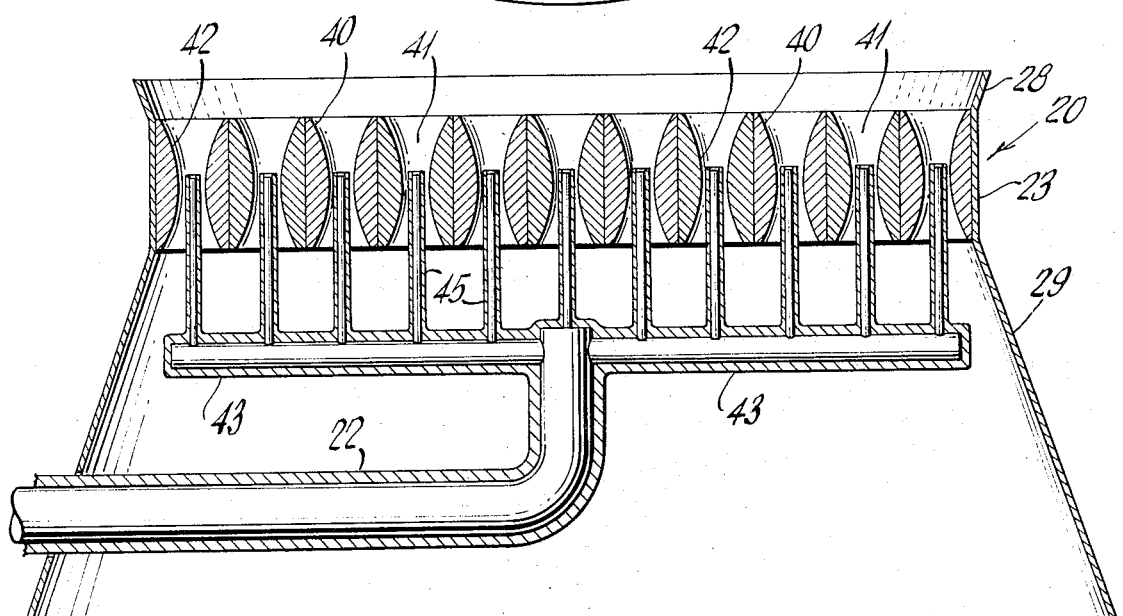
FIG. 3 is a front elevational view, taken along line 3—3 of FIG. 2.

The cross-section of mixing zone 23 is seen most clearly in FIG. 3. The portions of converging section 28 and diverging section 29 which are immediately adjacent to the mixing zone 23 are also shown in FIG. 3. FIG. 3 also shows the main solution supply pipe 22, a pair of distributor pipes 43 connected thereto, and a plurality of branch pipes 45 connected to distributor pipes 43. Each branch pipe 45 terminates in the throat of a venturi mixer 40 as above noted. Thus, each of the branch pipes 45 is indirectly connected to the main solution supply pipe 22.

The detail of an individual venturi mixer 40 is best seen in FIGS. 4 and 5. The passageway 41 is tapered in the manner of a conventional venturi passageway, having a throat 42 at approximately the center of the venturi mixer 40. One venturi mixer is provided for each of the vertical branch pipes 45. Each vertical branch pipe 45 includes a thin-walled metallic tube (e.g., stainless steel) 46 surrounded by a ceramic sleeve 47. Each vertical branch pipe 45 terminates in a nozzle 48 located at the venturi throat 42. The nozzle includes a nozzle insert 49, which is a cylindrical sleeve having a passageway of restricted cross-sectional area and preferably a conical discharge portion. Many nozzle designs are known in the art. Any of these which give uniform and fine dispersion of the solution at acceptable pressure drop and with trouble-free operation may be used. A plurality of guides 50 which may be integral with the venturi body 40 extend inwardly from the wall of passageway 41 and position the nozzle 48 in the center of the passageway.

Although the branch pipes 45 extend from the discharge sides of the venturis 40 in order to minimize the temperature to which the pipes and nozzles are exposed, the branch pipes 45 can instead extend into the venturis from the inlet side thereof. In that case, the entire ammonium sulfate solution distribution network, including main supply pipe 22, distributor pipes 43, cross connector pipes 44 and branch pipes 45 will be located on the upstream side of the mixing zone 23.

The main supply conduit 22, distributor pipes 43, and cross connector pipes 44 are insulated (not shown) in order to prevent premature evaporation of water within these pipes.

The invention will now be described in further detail with reference to the specific example which follows.

EXAMPLE

This example will be described with specific reference to FIG. 1. Reference numerals used herein refer to the reference numerals in the drawing and specifically to those in FIG. 1.

An ammonium sulfate slurry stream from an acidifier and initially at a temperature of about 200° F. and a pressure of about 10 p.s.i.g., is pumped in pump 11 to a pressure of 450 p.s.i.g. This ammonium sulfate slurry fresh feedstream in pipe 10 is mixed with molten ammonium bisulfate recycled in line 12, forming a mixed aqueous ammonium sulfate-ammonium-bisulfate aqueous solution in line 13. The weight ratio of recycle to fresh feed is about 1.4. Compositions and temperatures of streams 10, 12 and 13 are given in Table I below.

TABLE I

|  | Fresh feed, Stream 10 | Recycle, Stream 12 | Mixed solution, Stream 13 |
|---|---|---|---|
| Composition (pound moles/hr.): | | | |
| Water | 2,419 | 0 | 2,419 |
| Ammonium bisulfate | 297 | 1,910 | 2,207 |
| Ammonium sulfate in solution | 292 | 0 | 593 |
| Ammonium sulfate undissolved | 301 | 0 | 0 |
| Flow rate, lb./hr | 156,140 | 219,860 | 376,000 |
| Temperature, °F | 200 | 750 | 474 |

The mixed solution stream 13 contains about 11.6% by weight of water. The mixed solution at a temperature of 474° F. and a pressure of 450 p.s.i.g. is injected into the mixing zone 23 of reactor 20 at the throats 42 of the venturi mixers 40. A hot burner gas or combustion gas flows downwardly through reactor 20 at a rate of about 4200 pound moles/hour. The temperature of the combustion gas upstream of the mixing zone 23 is about 3000° F. In the preferred embodiment shown, a total of 91 venturi mixing elements 40 are provided in parallel, each having a throat diameter of 2.5 inches and a free cross-sectional area of about 1.74 square inches at the throat. The free cross-sectional area at the venturi throats is about 35% of the maximum cross-sectional area in the upstream portion. The gas pressure is about 45 p.s.i.a upstream, about 30 p.s.i.a. at the throat, and about 40 p.s.i.a. downstream of the throat. The temperature of the gas stream downstream of the mixing zone is about 750° F.

The gas downstream of the mixing zone contains 4200 moles/hour of burner gas, 593 moles/hour of ammonia, and 2419 moles/hour of water vapor (not including that in the burner gas), and 2800 moles/hour of ammonium bisulfate. The ammonium bisulfate product is collected in a pool in receptacle 30, and is at a temperature of about 750° F. The mixture of burner gas, ammonia, and water vapor is discharged through opening 32 in receptacle 30 at a pressure of about 20 p.s.i.g. The ammonium bisulfate is withdrawn from receptacle 30 through line 33. This stream 33 is split into a product stream 35 (890 pound moles/hour) and a recycle stream 12 (1910 pound moles/hour).

What is claimed is:

1. A process for decomposing ammonium sulfate which comprises:
   (1) injecting a hot aqueous solution comprising ammonium sulfate at elevated temperature and pressure into a flowing hot gas stream in a mixing zone of a reactor, the temperature of said hot gas being above about 900° F. upstream of said mixing zone, the pressure of said solution being substantially above the pressure of said gas in said mixing zone and the temperature of said solution being sufficiently high to result in flash evaporation of the solution when injected into the hot gas stream but below about 600° F., whereby the water content of the solution is flash evaporated and a cocurrently flowing stream comprising said hot gas, water vapor, ammonium sulfate and decomposition products thereof is formed, the major portion of said ammonium sulfate being decomposed into ammonium bisulfate and ammonia, the temperature of the mixture leaving the mixing zone being not over about 900° F.;
   (2) separating the ammonium bisulfate and unconverted ammonium sulfate from the gas mixture comprising said hot gas, ammonia, and water vapor; and
   (3) recovering a molten product comprising ammonium bisulfate.

2. The process of claim 1 in which a solution or slurry comprising ammonium sulfate is mixed with hot recycled ammonium bisulfate.

3. The process of claim 1 in which the water content of said hot aqueous solution comprising ammonium sulfate is in the range of about 10% to 50% by weight.

4. The process of claim 1 in which the heat content of said hot aqueous solution comprising ammonium sulfate is sufficient to supply all of the heat necessary for adiabatic evaporation of the water content thereof.

5. The process of claim 1 in which the temperature of said hot aqueous solution comprising ammonium sulfate is from about 350° F. to about 550° F.

6. The process of claim 1 in which said hot solution is free from undissolved solids.

7. The process of claim 1 in which said hot gas is hot combustion gas.

8. The process of claim 7 in which the temperature of said hot combustion gas upstream of said mixing zone is above about 2500° F.

References Cited

UNITED STATES PATENTS 3,383,170   5/1968   Furkert et al. _____ 423—356
Re. 24,550  10/1958  Sachsse et al. _____ 23—277 R OSCAR R. VERTIZ, Primary Examiner H. S. MILLER, Assistant Examiner U.S. Cl. X.R.

23—277 R; 423—356